No. 613,272. Patented Nov. 1, 1898.
C. T. HILDEBRANDT & F. R. McMULLIN.
MOTOR DRIVEN VEHICLE.
(Application filed Aug. 23, 1897.)
(No Model.) 3 Sheets—Sheet 1.
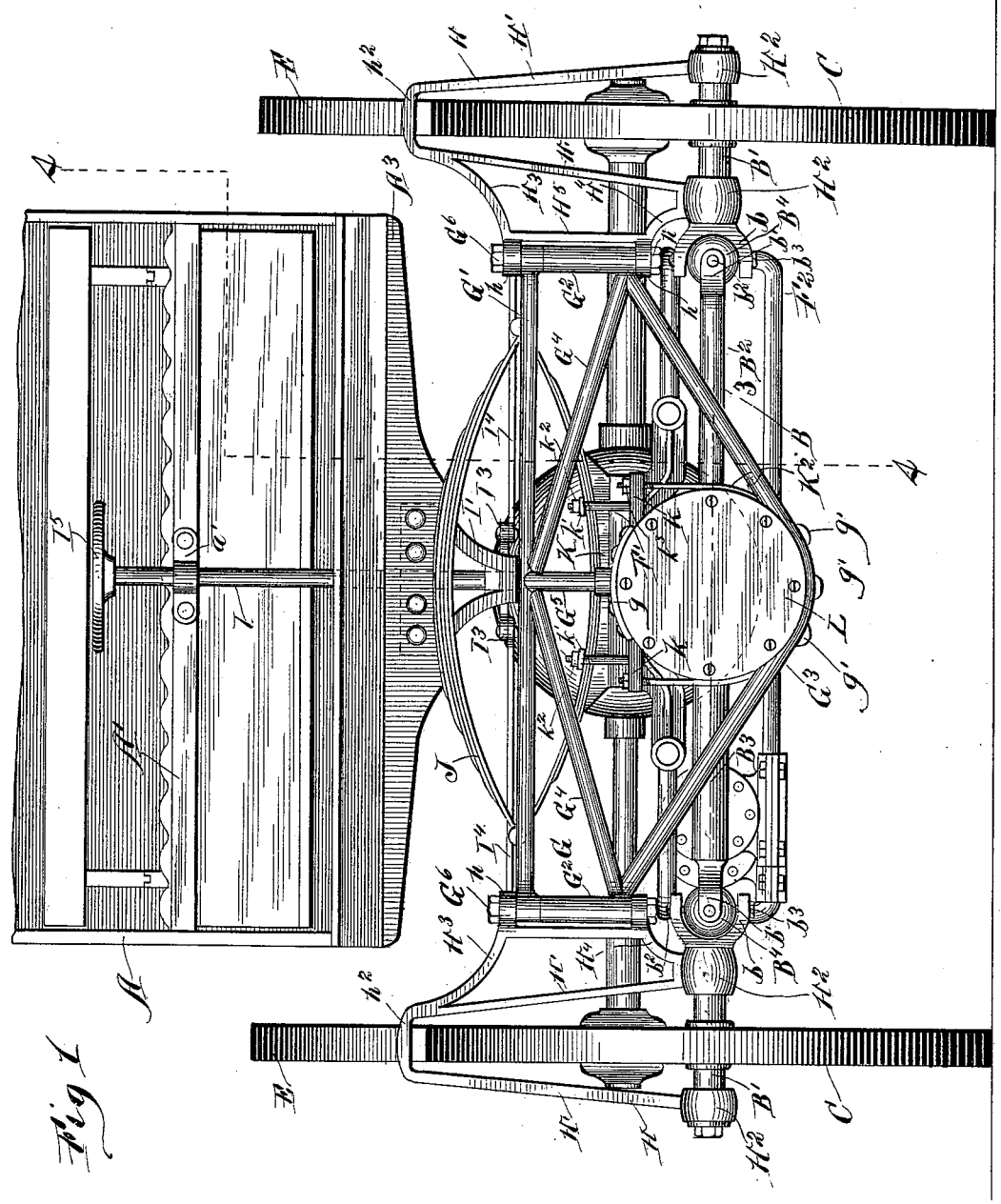
Witnesses
W. C. Coolies
C. H. Crawford
Inventors
Charles Theodore Hildebrandt
and Frank Roswell McMullin
By Pooley Brown Attys

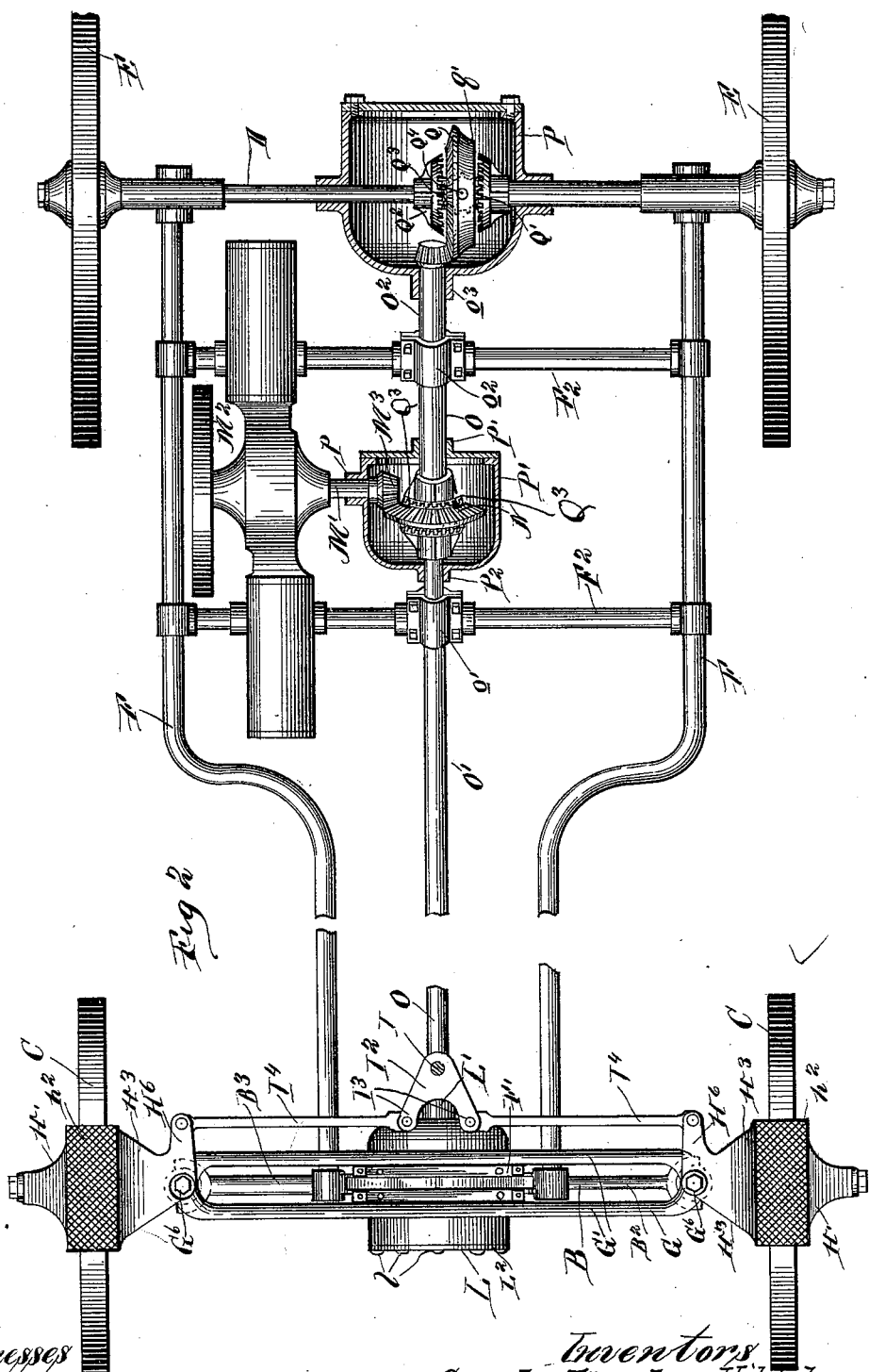

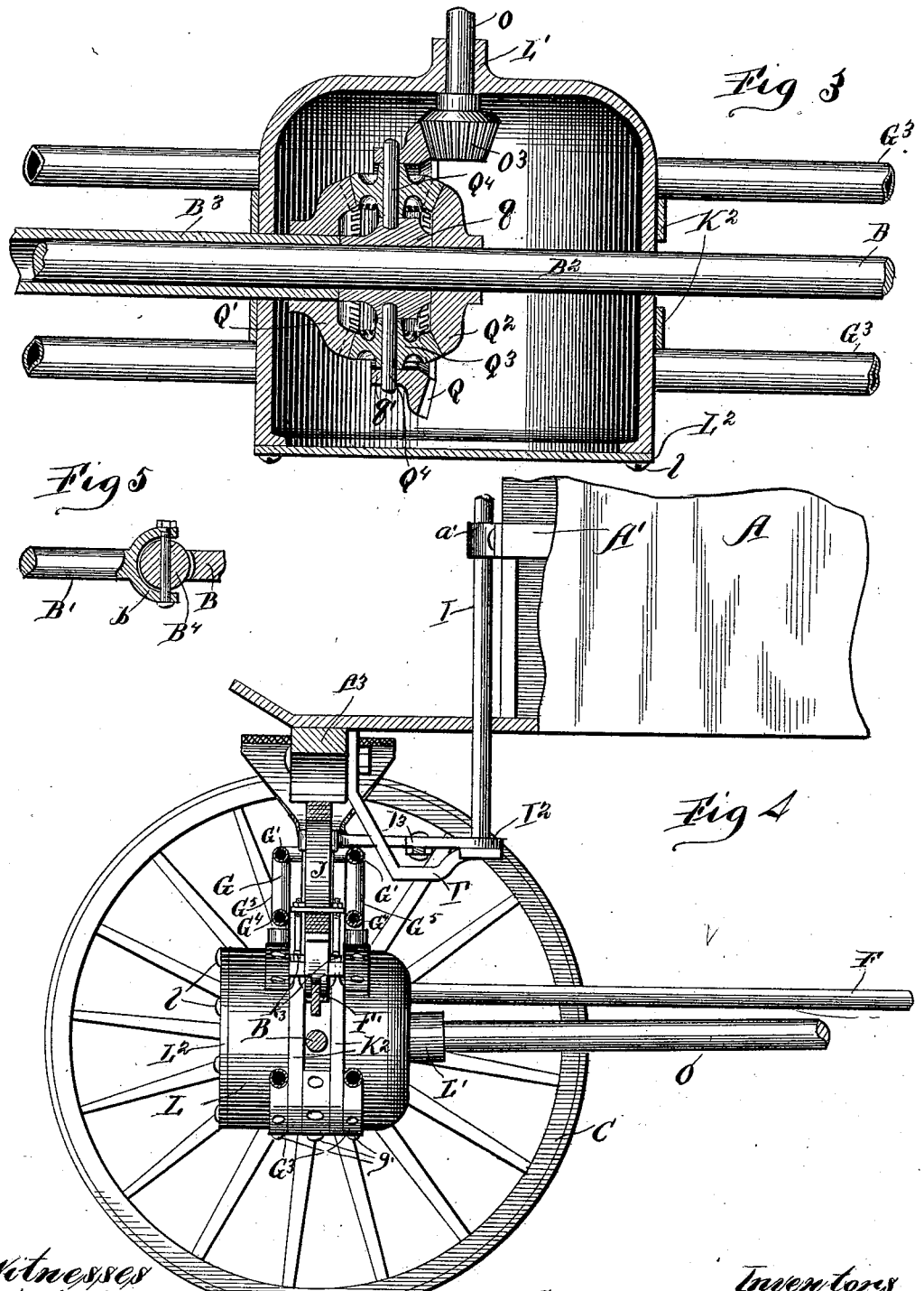

UNITED STATES PATENT OFFICE.

CHARLES THEODORE HILDEBRANDT AND FRANK ROSWELL McMULLIN, OF CHICAGO, ILLINOIS.

MOTOR-DRIVEN VEHICLE.

SPECIFICATION forming part of Letters Patent No. 613,272, dated November 1, 1898.

Application filed August 23, 1897. Serial No. 649,184. (No model.)

*To all whom it may concern:*

Be it known that we, CHARLES THEODORE HILDEBRANDT and FRANK ROSWELL McMULLIN, of Chicago, in the county of Cook and State of Illinois, have invented certain new and useful Improvements in Motor-Driven Vehicles; and we do hereby declare that the following is a full, clear, and exact description thereof, reference being had to the accompanying drawings, and to the letters of reference marked thereon, which form a part of this specification.

This invention relates to improvements in motor-driven vehicles, and refers more specifically to an improved construction in such vehicles which will permit either or both the front and rear axles to be connected with the driving-motor and to be positively driven therefrom, notwithstanding the fact that the axles and the wheels mounted thereon are employed for steering the vehicle.

Another object of the invention is to provide an improved steering device for such vehicles by which the vehicle may be readily and accurately guided when the front axle is connected to the motor.

The invention consists in the novel matters hereinafter set forth, and more particularly pointed out in the appended claims.

In the drawings, Figure 1 is a front elevation of a vehicle embodying our invention. Fig. 2 is a top plan view of the running-gears, showing the motor and its connections with the front and rear axles. Fig. 3 is a horizontal sectional view, somewhat enlarged, taken on line 3 3 of Fig. 1. Fig. 4 is a vertical sectional view taken on the line 4 4 of Fig. 1. Fig. 5 is a detail view illustrating one form of flexible joint.

In general terms our improvement consists in mounting each of the front wheels of the vehicle upon a short or stub axle, which latter is supported in a metal frame or bracket having a pivotal connection with the main frame of the vehicle. Each of the said pivoted frames or brackets is suitably connected to a conveniently-arranged steering wheel or lever, whereby both steering-wheels may be simultaneously turned in the desired direction. Suitably secured to said main frame is a two-part driving-shaft, the outer ends of each part of the said shaft being secured by universal joints or a flexible connection with the inner end of the stub-axles. Each member of said driving-shaft is connected with any desired source of power, such as electric or other motor, by means of suitable compensating gears and a connecting shaft or shafts. By this construction we are enabled to rotate, positively, both the front and rear wheels of our vehicle without in the least interfering with the steering mechanism.

Referring first to the general construction of the vehicle-frame, A designates a vehicle-body of common form provided with a seat A' in the front part thereof for the operator. The running-gears, which are shown in plan view in Fig. 2, consist generally of a front axle provided with a driving-shaft B, which is connected to and drives wheels C C, a rear axle D, provided with wheels E E, two oppositely-arranged and longitudinally-extending side members F F of the frame connected at their rear ends with the rear axle D and at their forward ends to a transversely-extending front member F' of the frame. Said longitudinal frame members F F are connected between their ends by means of transversely-arranged bars $F^2$ $F^2$, which serve to support the operative parts of the motor or driving mechanism, as will hereinafter more fully appear.

The driving-shaft B, which is mounted in the front-axle frame, is operatively connected with a driving-motor and is connected at its opposite ends with short spindles or stub-axles B' B', each of which carries one of the front supporting-wheels C C. The stub-axles B' B' are connected with the shaft by flexible connections, as will hereinafter more fully appear. Said shaft is composed of two members—namely, a shaft member $B^2$ and a tubular member or sleeve $B^3$—the two members having rotative and telescopic engagement with each other, the said shaft member $B^2$ extending into the tubular member or sleeve $B^3$. Both members are actuated by universal or compensating gears, as hereinafter explained. Any flexible connection between the ends of the shaft and said spindles or stub-axles B' B' may be used; but we have herein illustrated a universal joint. The inner ends of each of said spindles B' B' are provided with inwardly-curved divergent arms $b$, and the proximate ends of the driving-shaft are provided with similar outwardly-curved divergent arms $b'$. Said shaft and spindles are arranged end to end, and the proximate arms $b'$ $b'$ of each set are arranged in planes at right angles to each other, as shown in Figs. 1 and 5. Between said arms are interposed spherical balls $B^4$, which are rotatively mounted between the arms $b$ $b'$ by means of short supporting-studs $b^2$ $b^3$, arranged in planes at right angles to each other and engaging bearing-apertures in the outer ends of said arms. That portion of the front-axle frame between the said flexible connections is so arranged as to be incapable of any horizontal movement with respect to the main frame of the vehicle, but does have a vertical movement with relation to the frame of the vehicle, as will hereinafter appear, thus obviating the imparting of a side or rocking motion to the body of the vehicle when one of the front wheels strikes or passes over an obstruction. The front wheels C are connected together in such manner as to be maintained in their proper vertical relation with respect to the axle and to each other, while permitting the same to be turned with respect to the axle-frame upon a pivot coincident with the vertical axis of the flexible connection or universal joint at each end of the driving-shaft. The construction by which this result is secured may be described as follows:

G designates an intermediate portion of the front-axle frame, which, as shown, is mounted vertically over the driving-shaft and which consists of two horizontally-arranged members G' G', extending parallel to each other and to said shaft, and two vertically-arranged members $G^2$ $G^2$, rigidly connected, one at each end, to the members G' G'. The lower ends of said vertical members $G^2$ $G^2$ are connected by a lower brace member $G^3$, which is attached at its middle portion to a drum L, rigid with the front-axle frame, and by two obliquely-arranged brace members $G^4$ $G^4$, the inner ends of the latter being suitably secured to the horizontal members G', as shown in Fig. 1, and forming, with the member $G^3$, a diamond-shaped frame. A central short vertical frame member $G^5$ is suitably secured to the member G', and carries upon its lower end a curved plate $g$. A drum L is therefore secured to this frame between the plate $g$ and the lower frame member $G^3$ by rivets $g'$ or other suitable means. The end members $G^2$ $G^2$ of this frame are tubular and carry pivots or bolts $G^6$, upon which are secured brackets or yoke-frames H, the latter having horizontally-extending apertured lugs $h$, through which said pivots or bolts pass. Suitable nuts $h'$ on the bolt $G^6$ retain the latter in position. The brackets or yokes H are of arched form, consisting of upwardly-extending converging side members H', which are located on opposite sides of the wheel C and which carry at their lower ends journal-bearings $H^2$ for engagement with the opposite ends of the spindles B'. The side members H' H' of the yoke are connected together at their upper ends over the wheels C by means of short horizontal sections $h^2$, which are preferably widened to form a step for convenient use in mounting the vehicle. The inner side members H' of each yoke are provided with inwardly-extending arms $H^3$ $H^4$, which are connected by a vertical member $H^5$, and are provided with the apertured lugs $h$ before referred to. This construction permits the required movement of the steering-wheels in steering the vehicle without the necessity of pivotally connecting the axle at the center thereof, as is common in such constructions, and thereby permits the main part of the axle to be operatively connected with the driving-motor.

The means for steering the vehicle are provided as follows:

$H^6$ $H^6$, Fig. 2, designate short rearwardly-extending arms which are formed integral with the arms $H^8$ of the yokes H. A short shaft I is mounted at its upper end in a bearing $a'$ in the front of the wagon-body and at its lower end in a supporting-bracket I', secured to a transverse supporting-bar $A^3$, upon which the forward end of the vehicle-body rests. Upon the lower end of said shaft is rigidly mounted a plate $I^2$, provided with divergent forwardly-extending arms $I^3$, which latter are connected with the rearwardly-extending arms $H^6$ of the yoke H by means of connecting-rods $I^4$. The upper end of the shaft I is provided with a suitable lever or hand-wheel $I^5$, by means of which the shaft may be rotated, and the wheels C, through the connections described, turned as desired to steer the vehicle. With this construction it follows that as the hand-wheel $I^5$ is turned in one direction or the other the spindles B' and the wheels C, mounted thereon, will be turned at an angle to the main-axle section B and intermediate frame G and the course of the vehicle correspondingly changed.

The body A is mounted upon the axle-frame by means permitting the frame to rock upon a horizontal pivot when one of the wheels is raised by coming in contact with an obstruction or for any other reason without causing the movement to be transmitted to the vehicle-body. The construction by which this is accomplished is as follows: The body A rests at its forward end upon an elliptical spring J, which is secured in any suitable manner to the transverse bar $A^3$. The lower member of said elliptical spring rests upon the upper concave surface of a bolster-block K, preferably of wood, the under side of said bolster-block being flat and resting upon a corresponding surface of the front or transverse member F' of the main frame, to which the forward ends of the frame members F F are secured. Laterally-projecting lugs $k$ extend from each side of the cross-piece F', at each end thereof, as shown, and receive the lower screw-threaded ends of four tie-bolts. The upper ends of these bolts pass through suitable apertures in retaining or clip plates $k'$, which latter are placed upon the inside surface of the lower member of the elliptical spring, and being of greater width than the spring extend on either side thereof, as shown. A lock-nut $k^2$ secures the plate $k'$ in place. The plate and bolt thus form a suitable clip which holds or ties the front frame member F, the bolster-block K, and the elliptical spring firmly together.

As shown in the plan view, Fig. 2, the front frame-piece F' is not as long as the frame-pieces $F^2$, and therefore the side frame members are directed inwardly toward each other at their forward ends. The usual bolster-block $A^3$ is interposed between the upper member of the elliptical spring and the vehicle-body. The drum or cylindric casing L, before referred to as being rigidly connected to the front-axle frame, incloses the gear connection between the driving-shaft and the counter-shaft, which latter is in turn connected with the main driving-gear of the motor, as will more fully appear. In order, therefore, that this casing or drum, which is rigidly secured to the front-axle-frame member $G^2$, as previously explained, may have rotative connection with the main frame and the wagon-body secured thereon, the lower central surface of the front main-frame member F' is concave and rests directly upon the upper exterior surface of said casing or drum L, the said frame member F' being thus movably united with the said casing or drum L by means of flat strips or bands $K^2$, the upper ends of which are formed into a screw-threaded-bolt construction and project through suitable apertures in the said lugs $k$ and are secured to said lugs by means of nuts $k^3$. By this construction it will be noted that when one of the wheels C strikes a projection or is raised vertically the said drum L will rotate in its bearing—to wit, between the retaining-surface $K^2$ and the front main-frame piece F'—without disturbing the gear connection between the gears on the axle contained in said casing or drum and the gear on the said counter-shaft that is also without said casing or drum.

Power is communicated from the motor to the wheels by the following connections: $M^3$ designates a bevel gear-pinion mounted upon the end of the power-shaft opposite to the balance-wheel $M^2$. Said pinion intermeshes with a larger pinion N, which is mounted upon a counter-shaft O, which extends longitudinally of the main frame between the two side members F F and is operatively connected at its opposite ends with the rear and front axles by means hereinafter to be described. Said shaft has bearing between its ends in bearing-blocks $o'$ $o^2$, mounted on the transverse braces $F^3$ of the frame, and also has a bearing L' at its forward end in the casing L. At its rear end the counter-shaft O has a bearing $o^3$ in a second casing or drum P, which similarly surrounds the gear connections between said shaft and the rear axle D. The counter-shaft O has two members O' $O^2$, having rotative and telescopic connection with each other the same as the front steering-axle B, and gear connections similar to those on said axle within the drum L are provided for said two-part counter-shaft and are located within a third drum or casing P'. This drum has outwardly-extending journal bosses or bearings $p$ $p'$ $p^2$, through which the shaft M' and the counter-shafts O' $O^2$ pass, respectively, and whereby the casing P' is suitably held in position. The operative connections between the driving-shaft and the counter-shaft and between the latter and the steering-axle on one end and the rear axle on the other are of that class in which a differential motion may be given to the opposite sections of the axle. The connections at each end and between the driving-shaft and the counter-shaft of the sections are the same, and therefore the following description will be confined to the connections between the counter-shaft and the front axle alone. These parts are shown somewhat enlarged in Fig. 3. In said figure the counter-shaft O is shown as provided at its forward end, within the casing L, with a bevel gear or pinion $O^3$, which latter meshes with the teeth of the face of the ring Q. Upon the end of the sleeve member $B^3$ of the front axle is a bevel-gear Q', and upon the shaft member $B^2$ of the front axle is a bevel-gear $Q^2$, the said bevel-gears Q' $Q^2$ facing each other. The hub $q$ of the ring Q is loosely mounted upon the shaft member $B^3$. In diametrically oppositely arranged apertures in the web of the ring Q are the two pinions or bevel-wheels $Q^3$, each being positioned to rotate freely or loosely upon the pin or stud $Q^4$ as an axis, said stud in each instance passing through the flange $q'$ and being stepped in a suitable recess in the hub $q$, as clearly shown in Fig. 3. The bevel-gears Q' $Q^2$ are positioned in such proximity to each other as to cause their respective teeth to intermesh with the teeth of the said pinions $Q^3$. From this construction it follows that rotary motion imparted through the counter-shaft O and pinion $O^3$ to the ring Q will in turn be imparted to the sleeve member $B^3$ and shaft member $B^2$ of the front axle B through the medium of the pins $Q^4$, the intermediate pinions $Q^3$, and the pinions Q' $Q^2$. If now the front wheels be turned to one side or the other, as in going around a corner, it is manifest that one of the wheels will take a shorter curve than the other, and consequently will rotate more slowly, thus causing an inequality which this well-known form of differential gear will equalize. For example, if the sleeve member $B^3$ and its pinion Q' have more resistance than the shaft member $B^2$ and its pinion $Q^2$ the pinion Q' will rotate more slowly, and thus the pinion $Q^2$ will rotate more readily and faster than would otherwise be due to the motion communicated through the pinion $Q^3$ and the counter-shaft O. In other words, the wheel on one side is retarded and on the other side its motion is increased and the engine enabled to turn as readily as before because of the equalizing or differential gear arrangement referred to. Said casing is provided at its forward end with a removable cover $L^2$, secured thereto by screws $l$. Said cover is provided for the purpose of conveniently reaching the interior of the casing to adjust the parts of the gearing. The gear connections between the rear axle and said shaft O is similarly inclosed in a casing P. Said casing is also provided with a removable end or cover $p'$, by which access to the interior thereof may be had.

We claim as our invention—

1. A steering mechanism for vehicles comprising a running-gear frame, a steering-frame pivoted to one end thereof to swing in a vertical plane, a rotative shaft in said steering-frame, spindles joined to each end of said shaft by flexible connections, and yokes pivoted to said steering-frame to swing on vertical pivots separate from and vertically above said flexible connections of the shaft and spindle said yokes being constructed to afford bearings at their lower ends for said spindles.

2. A steering mechanism for vehicles comprising a running-gear frame, a steering-frame pivoted at one end thereof to swing in a vertical plane, a rotative shaft in said steering-frame, spindles joined to each end of the shaft by flexible connections, wheels on said spindles, said frame comprising an upper horizontal member and two vertical members, rigidly connected therewith, vertically above said flexible connections between the spindles and shaft and yokes pivoted to said vertical members on the frame independently of the flexible connections between said spindles and shaft and constructed to afford bearings at their lower ends for said spindles.

3. A steering mechanism for vehicles comprising a running-gear frame, a steering-frame pivoted at one end thereof to swing in a vertical plane, a rotative shaft in said steering-frame, spindles joined to each end of the shaft by flexible connections, wheels on said spindles, said steering-frame comprising an upper horizontal member and two vertical members, rigidly connected therewith, vertically above said flexible connections of the spindles with the shaft, and yokes pivoted to said vertical members of the steering-frame independently of the flexible connections between the spindles and shaft and constructed at their lower ends to afford bearings on each side of said wheels for the spindles.

4. A steering mechanism for vehicles comprising a running-gear frame, a steering-frame pivoted at one end thereof to swing in a vertical plane, a rotative shaft in said steering-frame, spindles joined to each end of the shaft by flexible connections, wheels on said spindles, said frame comprising an upper horizontal member and two vertical members rigidly connected therewith vertically above said flexible connections between the spindles and shaft, yokes pivoted to said vertical members on the frame independently of the flexible connections between said spindles and shaft and constructed to afford bearings at their lower ends for said spindles and means within the reach of the operator for turning said yokes upon their pivots.

5. A steering mechanism for vehicles comprising a steering-frame, a rotative shaft in said frame, spindles joined to each end of the shaft by flexible connections, wheels on said spindles, said frame comprising an upper horizontal member and two vertical tubular members, rigidly connected therewith, vertically above said flexible connections between the spindles and shaft, yokes constructed to afford bearings at their lower ends for said spindles and provided with inwardly-extending lugs which overlap the upper and lower end of said vertical member of the frame and pivot-bolts passing through said lugs and said tubular frame members.

6. A motor-driven vehicle, comprising a main frame, a motor supported thereon, an axle-frame comprising a rotative shaft, spindles which are pivoted thereto by flexible connections, said rotative shaft comprising a shaft-section and a sleeve or tubular section which have telescopic engagement at their inner ends, wheels carried by said spindles, means for preventing vertical flexure between said shaft and spindles, and means for driving said shaft and spindles from the motor embracing a differential-gear mechanism on said shaft and operative connections between said gear mechanism and the motor.

7. A motor-driven vehicle, comprising a running-gear frame, a motor supported thereon, an axle rotatively mounted in the rear part of said frame, a rotative shaft mounted in the forward end thereof, said axle and shaft each comprising a shaft-section and a sleeve-section which have telescopic engagement at their inner ends, and means for driving both said axle and shaft from the motor, comprising a differential-gear mechanism carried by said axle and shaft and operative connections between said motor and the gear mechanism.

8. In a vehicle running-gear, the combination with two oppositely-arranged longitudinal side members, an axle connected with the rear ends thereof, and an axle-frame provided with a horizontally-arranged cylindric casing of a bolster-block mounted on said casing to which the forward ends of said side members of the frame are attached.

9. In a vehicle running-gear, the combination with two oppositely-arranged longitudinal side members, an axle connected to the rear ends thereof, and a frame provided with a rotative shaft, a motor on the vehicle, gear mechanism between said motor and shaft of the steering-frame, a cylindric casing surrounding the gear mechanism on said shaft, of a bolster-block mounted on said casing and provided with laterally-extending arms with which the forward ends of said side members are connected, and means for securing said block upon the casing.

10. In a vehicle running-gear, the combination with oppositely-arranged longitudinal side members, an axle connected with the rear ends thereof and a front-axle frame, of means for pivotally connecting said frame with the forward ends of said longitudinal members to swing on a horizontal axis, comprising a cylindric casing supported on said frame, a bolster-block pivotally mounted on the casing and provided with oppositely and laterally extending arms with which the forward ends of the said members are connected, laterally-extending lugs on said block and a strap extending between the opposite ends of said lugs and embracing said casing.

11. In a motor-driven vehicle, the combination of a running-gear embracing oppositely-arranged longitudinal side members, an axle connected with the rear ends thereof, a frame provided with a rotative shaft, a motor on the vehicle, gear mechanism between said shaft and said motor, and a cylindric casing inclosing the gear mechanism of said shaft, of a bolster-block mounted on said casing and with which the casing has pivotal engagement, means for connecting the forward ends of the said members to the said block, and means for holding said block upon the casing.

12. In a motor-driven vehicle, the combination with the running-gear embracing oppositely-arranged longitudinal side members, an axle connected with the rear ends thereof, a steering-frame embracing a rotating shaft, spindles pivoted to the opposite ends thereof by universal-joint connections, means for preventing vertical flexure between said shaft and spindles, a motor on the vehicle, gear connections between said motor and said shaft, and a cylindric casing inclosing the gear mechanism of said shaft, of a bolster-block pivotally mounted on said casing, to which the forward ends of the side members of the running-gears are connected, and means for holding said block on the casing.

13. In a motor-driven vehicle, the combination with the running-gear embracing oppositely-arranged longitudinal side members, an axle connected with the rear ends thereof, a steering-frame embracing a rotative shaft, spindles pivoted to the opposite ends thereof by flexible connections, means for preventing said vertical flexure between said shaft and spindles, a motor on the vehicle, gear connections between said motor and said shaft, and a cylindric casing inclosing the gear mechanism of said axle, of a bolster-block pivotally mounted on said casing to which the forward ends of the side bars of the running-gears are connected, and means for holding said block on the casing comprising laterally-extending lugs on said block, and a strap extending between the opposite ends of said lugs and embracing the casing.

14. In a motor-driven vehicle, the combination with a running-gear embracing oppositely-arranged longitudinal side members, an axle connected with the rear ends thereof, a steering-frame comprising an upper horizontal member, two vertical members connected therewith, yokes pivoted to said vertical members, a rotative shaft mounted in said frame, spindles mounted in the yokes and pivoted to the opposite ends of the shaft by flexible connections vertically under said pivotal connection of said yokes with the frame, a motor on said vehicle, gear connections between said motor and said shaft of the steering-frame, and a cylindric casing inclosing the gear mechanism on said steering-axle and supported in said frame, of a bolster-block which is pivotally engaged with said casing and means for connecting the forward ends of said side bars with said block.

15. In a motor-driven vehicle, the combination with a running-gear embracing oppositely-arranged longitudinal side members, an axle connected with the rear ends thereof, a steering-frame comprising an upper horizontal member, two vertical members connected therewith, a rotative shaft mounted in said frame, spindles connected with the shaft by flexible connections, yokes pivoted to said vertical members of the frame to swing on a vertical axis vertically above said flexible connection of the shaft and spindles and in the lower ends of which the spindles are mounted, a motor on the vehicle, gear connections between said motor and shaft, a cylindric casing inclosing the gear mechanism of said shaft and means for supporting said casing in the frame comprising a bar connected at its opposite ends with said vertical members of the frame and engaging the lower side of said casing, of a bolster-block pivotally engaged with said casing, means for securing the forward ends of the side members thereto, and means for holding said block upon the casing.

In testimony that we claim the foregoing as our invention we affix our signatures, in presence of two witnesses, this 17th day of August, A. D. 1897.

CHARLES THEODORE HILDEBRANDT.
FRANK ROSWELL McMULLIN.

Witnesses:
TAYLOR E. BROWN,
R. CUTHBERT VIVIAN.